United States Patent
Cho et al.

(10) Patent No.: US 7,484,358 B2
(45) Date of Patent: Feb. 3, 2009

(54) CONTINUOUS REFORMING OF DIESEL FUEL FOR NOX REDUCTION

(75) Inventors: Byong K. Cho, Rochester Hills, MI (US); Keith L. Olson, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 783 days.

(21) Appl. No.: 11/155,179

(22) Filed: Jun. 17, 2005

(65) Prior Publication Data

US 2006/0283175 A1 Dec. 21, 2006

(51) Int. Cl.
*F01N 3/00* (2006.01)
(52) U.S. Cl. .................. 60/275; 60/274; 60/286; 60/295; 60/301
(58) Field of Classification Search .......... 60/274, 60/275, 286, 295, 301, 303
See application file for complete search history.

(56) References Cited

U.S. PATENT DOCUMENTS

| | | | | |
|---|---|---|---|---|
| 6,038,853 | A * | 3/2000 | Penetrante et al. | 60/274 |
| 6,176,078 | B1 * | 1/2001 | Balko et al. | 60/274 |
| 6,772,584 | B2 * | 8/2004 | Chun et al. | 60/275 |
| 6,775,972 | B2 * | 8/2004 | Twigg et al. | 60/275 |
| 2004/0000475 | A1 | 1/2004 | Cho et al. | |
| 2004/0000476 | A1 | 1/2004 | Cho et al. | |
| 2004/0107695 | A1 | 6/2004 | Cho et al. | |

FOREIGN PATENT DOCUMENTS

WO 03027452 4/2003

OTHER PUBLICATIONS

Co-pending U.S. Appl. No. 10/864,717, filed Jun. 9, 2004, "NO Reduction with Diesel Fuel Reformed by Nonthermal Hyperplasma", Cho.
Co-pending US Appln. No., "Reforming Diesel Fuel for NOx Reduction", Cho.
International Search Report and Written Opinion for PCT/US06/16150 dated Jun. 13, 2008.

* cited by examiner

*Primary Examiner*—Thomas E Denion
*Assistant Examiner*—Diem Tran

(57) ABSTRACT

Raw diesel fuel is reformed to produce partially oxygenated hydrocarbons in the liquid fuel by use of a nonthermal plasma reactor. The reformed diesel fuel is formed by passing a stream of air plasma bubbles through a liquid volume of diesel fuel to strip low molecular weight hydrocarbons from the fuel, while partially oxygenating an abundance of them as a reformate for addition to the exhaust. This reformed diesel fuel is introduced as a sidestream into the exhaust of a diesel engine or other lean-burn power plants as reactants for selective catalytic reduction of nitrogen oxides in the exhaust. Fresh fuel is added to the liquid volume as diesel reformate is stripped from it, and a portion of the stripped fuel is withdrawn from the liquid volume.

20 Claims, 6 Drawing Sheets

CONTINUOUS REFORMING OF DIESEL FUEL FOR NOX REDUCTION

TECHNICAL FIELD

This invention pertains to the use of air plasma-reformed diesel fuel in selective catalytic reduction of NOx in the exhaust of a diesel engine or other lean burn engine or power plant. More specifically, this invention pertains to a method and equipment for continuous fractionation and reformation of diesel fuel with air plasma for NOx reduction.

BACKGROUND OF THE INVENTION

Diesel engines and other lean-burn engines or power plants are operated at higher than stoichiometric air to fuel mass ratios for improved fuel economy. Such lean-burning engines produce a hot exhaust with a relatively high content of oxygen and nitrogen oxides ($NO_x$). The temperature of the exhaust from a warmed-up diesel engine is typically in the range of 200° C. to 400° C. and has a representative composition, by volume, of about 10-17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

Co-pending patent application, docket number GP-305427, titled Reforming Diesel Fuel for NOx Reduction, and assigned to the assignee of this invention, discloses a method of fractionating diesel fuel and reforming the fractionated vapor for use in the selective catalytic reduction of NOx (including NO and $NO_2$) in an exhaust from a lean burn combustion source. The fractionated diesel fuel vapor is reformed to yield relatively low molecular weight oxygenated hydrocarbons using air plasma produced in a nonthermal plasma reactor. The reformed material is added to the exhaust to provide oxygenated hydrocarbon reactants for catalytic reduction of $NO_2$. A separate side stream of ozone-containing air plasma is also added to the exhaust for oxidation of NO to $NO_2$.

The subject invention provides apparatus and a continuous operating method for nonthermal plasma reforming of diesel fuel hydrocarbons.

SUMMARY OF THE INVENTION

Diesel fuel, which is not as volatile as gasoline, contains a mixture of liquid hydrocarbons formulated for injection into cylinders of a diesel engine and ignition by heat of compression to generate motive power. This invention provides a continuous fractionation and reforming practice for obtaining relatively low molecular weight oxygenated hydrocarbons from diesel fuel for use in catalytic reduction of nitrogen oxides, NOx, in an oxygen and water containing lean-burn exhaust. Obviously, this invention is particularly useful for treating exhaust from a diesel engine. Liquid fuel is suitably stored for delivery to the operating engine, and the storage and delivery system can be used to divert a relatively small portion of the fuel for treatment of the engine's exhaust. But this invention can be used in treatment of NOx-containing exhaust from other lean burn combustion sources.

Diesel fuel is pumped to a vessel for fractionating and reforming. The vessel holds a volume of the liquid and provides a vapor space. The liquid is sparged with a stream of ozone-containing air plasma. Rising bubbles of air plasma vaporize (strip) a relatively low molecular weight hydrocarbon vapor fraction from the liquid into the vapor space. Simultaneously, ozone and other plasma energized species reform hydrocarbon molecules into alcohols, aldehydes and alkenes. The flowing air plasma carries hydrocarbons and oxidized hydrocarbons (OHC) from the vessel to the hot exhaust with reactants for catalytic reduction of nitrogen oxides. And residual fuel is continually returned to the fuel storage or to the lean burn engine.

When the diesel fuel is "seeded" with a trace of ethanol, the generation of OHCs is increased beyond the amount of alcohol added. The amount of seed OHC material is kept below flammability limits of, for example, the alcohol-hydrocarbon fuel mixture.

Air plasma is generated in a nearby flow-through nonthermal plasma reactor by conducting a stream of air (which may contain re-circulated exhaust gas) through a high frequency electrical field. Energetic electrons in the plasma convert some oxygen molecules to ozone and produce other activated atoms, radicals, and ions in the air stream. The role of the air plasma is important in reforming the diesel fuel. Moreover, the size and effectiveness of the plasma generator is important particularly in on-vehicle applications because of space limitations.

Accordingly, in a preferred embodiment, the plasma generator is a tube having a dielectric cylindrical wall defining a reactor space. A linear, high voltage electrode is disposed along the axis of the tube within this reactor space. An outer ground electrode, comprised of electrically conductive wire (or the equivalent), is spirally wound around the cylindrical dielectric wall in a sequential pattern having a selected pitch that provides an axially discrete spacing between each turn of the wire. Application of a high frequency, AC voltage to the central electrode creates plasma in the ambient air passed through the reactor. The combination of the helical ground electrode having a discrete spacing between each turn and the linear axial electrode produces intertwined helical regions of active and passive electric fields. The active fields produce energetic electrons (plasma) in the air. The passive electric field regions allow better mass transfer of the air constituents and more efficient formation of ozone and activated ions and radicals. Such a flow-through plasma generator design has been termed a hyperplasma reactor because it facilitates the formation of ozone in a flowing stream of air with lower input of electrical power, i.e., lower W/L/s or lower J/L.

Other objects and advantages of the invention will become apparent from a detailed description of preferred embodiments which follow.

DESCRIPTION OF THE PREFERRED EMBODIMENT

The practice of the invention utilizes liquid diesel fuel of a quality and type specified for operation of a diesel engine powered vehicle. The vehicle is usually provided with a fuel tank for holding a volume of the liquid hydrocarbon-containing fuel.

The present invention discloses a method of producing gaseous reformates with a high OHC/HC product ratio from raw diesel fuel proper (or raw diesel fuel seeded with a trace amount of ethanol), using a continuous fuel reformer with the help of a hyperplasma reactor. In this invention, a portion of the raw diesel fuel on its way to the engine for its injection can be reformed continuously to produce OHC's in high concentrations to meet the requirement for efficient NOx reduction.

Figure 1:
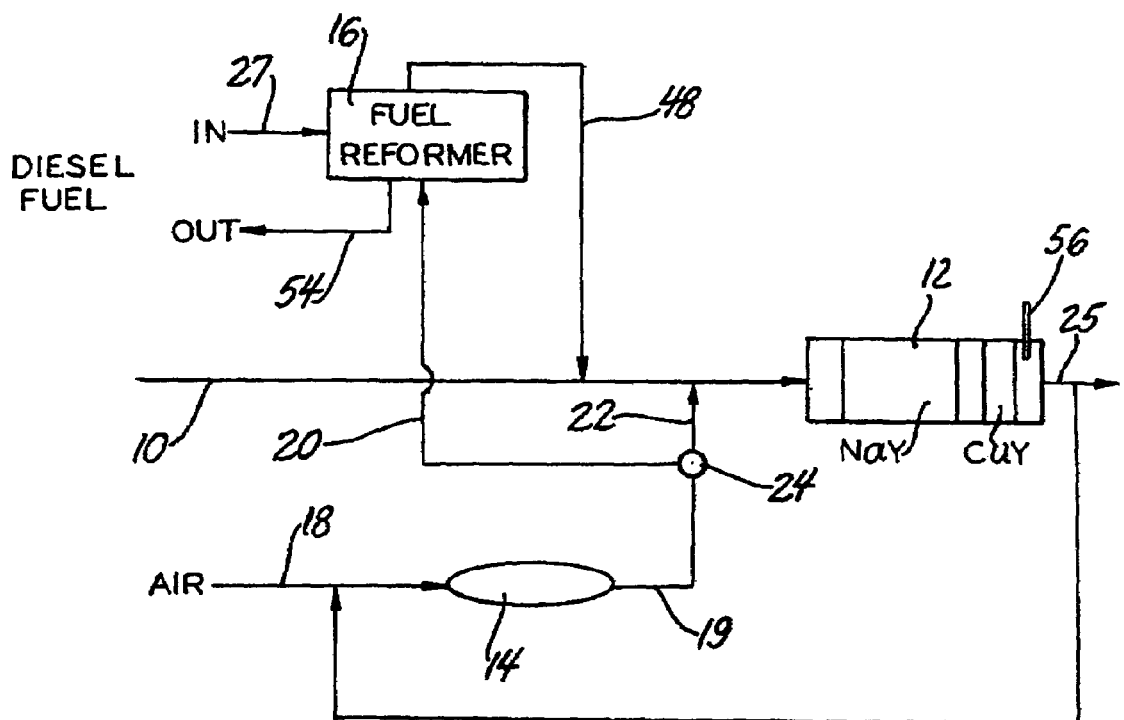
FIG. 1 is a schematic flow diagram of a process for conversion of NOx in an exhaust stream by reformed diesel fuel/selective catalytic reduction.

In FIG. 1, stream 10 represents the exhaust from a diesel engine powered vehicle such as a passenger car, truck or the like. The temperature of the exhaust from a warmed up medium-duty diesel engine is typically in the range of about 200° C. to 400° C. and has a representative composition, by volume, of about 10-17% oxygen, 3% carbon dioxide, 0.1% carbon monoxide, 180 ppm hydrocarbons, 235 ppm $NO_x$ and the balance nitrogen and water. In some engine applications a portion of the exhaust is recycled to the engine as part of the air intake for further combustion of unburned hydrocarbons and oxidation of carbon monoxide to carbon dioxide. Also, the exhaust may be passed through a catalytic oxidation reactor for the same purpose. But, in accordance with this invention, the exhaust is ultimately subjected to a selective catalytic reduction process for conversion of NOx to nitrogen.

Referring to FIG. 1, exhaust stream 10 flows to a dual-bed catalytic reduction reactor 12. But there are sidestream additions to exhaust 10 from nonthermal hyperplasma reactor 14 and diesel fuel fractionator and reformer 16. The design and operation of a suitable nonthermal plasma reactor 14 for production of air plasma will be described in more detail with reference to FIG. 3. However, the focus of this invention is the design and operation of a diesel fuel fractionator and reformer 16. Fuel reformer 16 operates in a continuous mode, simultaneously reforming and fractionating the raw diesel fuel in a single unit to produce gaseous reformate containing partially oxidized HC's (OHC's) such as alcohols and aldehydes. The reformed stream is added as a side stream to the exhaust, and the unused higher molecular weight portion of the fuel is eventually consumed in the engine. Continuous fuel reformer 16 will be described with reference to FIG. 2. Dual-bed catalytic reactor 12 comprises an upstream bed of NaY (or BaY) zeolite reduction catalyst and a downstream bed of CuY zeolite reduction catalyst. The exhaust stream 25 from dual-bed catalytic reactor 12 enters the atmosphere except for a portion which may be returned to hyperplasma reactor 14 as an exhaust gas recirculation stream 26.

Nonthermal plasma reactor 14 is sized and supplied with suitable electric power to generate a stream volume of ozone-containing air for the dual purpose of a direct ozone addition to exhaust stream 10 and for fractionating and reforming diesel fuel for subsequent addition to the exhaust stream. Plasma reactor 14 is located close to, but away from, the hot exhaust pipe. It generates air plasma from ambient air [or a mixture of ambient air and a recycled exhaust gas (EGR, stream 26)], which contains ions, radicals, atoms and ozone. EGR stream 26 can be used to enhance the overall efficiency of the system, by warming up the feed air, stream 18, while recycling in the exhaust stream unconverted oxidized hydrocarbons (OHC's) and NOx for further treatment with the hyperplasma.

Figure 3:
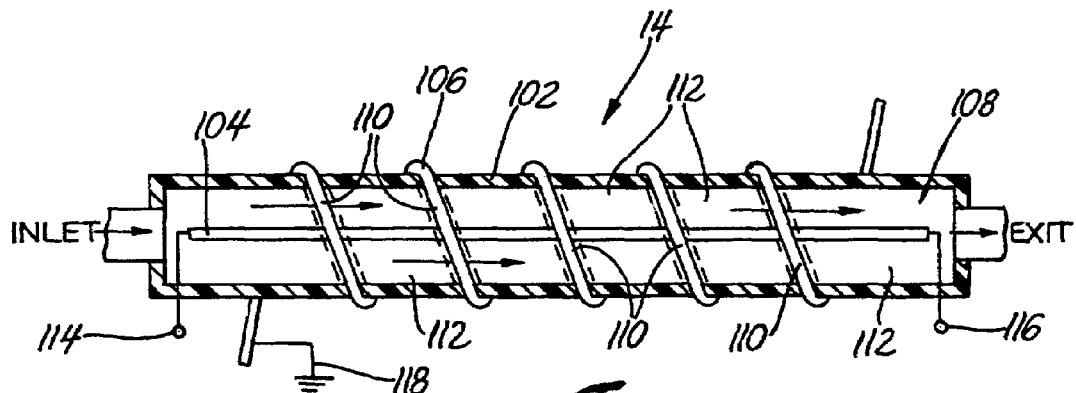
FIG. 3 is a cross-sectional side view of a hyperplasma reactor suitable for diesel fuel reforming.

In FIG. 3, a nonthermal plasma reactor 14 is illustrated that is suitable for generating ozone in a stream 18 (FIG. 1) of ambient air. The air stream is suitably supplied by an engine compartment blower, not shown, through a flow duct for air stream 18.

Non-thermal plasma reactor 14 comprises a round tubular dielectric body 102 suitably made of a ceramic material. The reactor 14 has two electrodes, a high voltage electrode 104 and a ground electrode 106, separated by the tubular dielectric body 102 and an air gap 108. The high voltage electrode 104 is a straight rod placed along the longitudinal axis of the tube 102. The ground electrode 106 is a conducting wire wound around the tubular dielectric body 102 in a helical pattern. The helical ground electrode 106 in combination with the axial high voltage electrode 104 provides intertwined helical regions of active 110 and passive 112 electric fields along the length of the reactor 14. The helical active electric field 110 around the ground electrode 106 is highly focused for effective plasma generation for ozone formation from molecular oxygen. Reactor 14 is effectively a hyperplasma generator for purposes of the practice of this invention.

A high voltage, high frequency electrical potential is applied to the end leads 114, 116 to the center electrode. The helical outer ground electrode 106 is grounded as indicated at 118. In the operation of the nonthermal hyperplasma reactor 14, air stream 18 (which may include re-circulated exhaust gas, stream 26, as described below) flows through the INLET of reactor 14 around center electrode 104 and within dielectric tube 102 and out of the EXIT end in the direction of the arrows seen in FIG. 3. The electrical potential applied to center electrode 104 generates the above described active 110 and passive 112 electric fields within the reactor 14. These intertwined high potential, high frequency fields 110, 112 are very effective in generating reactive ozone and oxygen atom, radical, and ion containing species within the flowing air stream in the air gap 108. This ozone-containing air stream leaves the nonthermal plasma reactor 14 and enters plasma reactor outlet line 19 as indicated in FIG. 1. A further description of such a low power plasma reactor system is provided in U.S. Patent Application Publication No. 2004/0107695 by Cho et al and dated Jun. 10, 2004.

The output stream 19 from hyperplasma reactor 14 is divided by proportioning valve 24 into two air plasma streams 20 and 22. Air plasma stream 22 is added directly to exhast stream 10 to oxidize NO to $NO_2$. Stream 20 flows to diesel fuel fractionator-reformer 16 to promote the partial oxidation and fractionation of diesel fuel.

Figure 2:
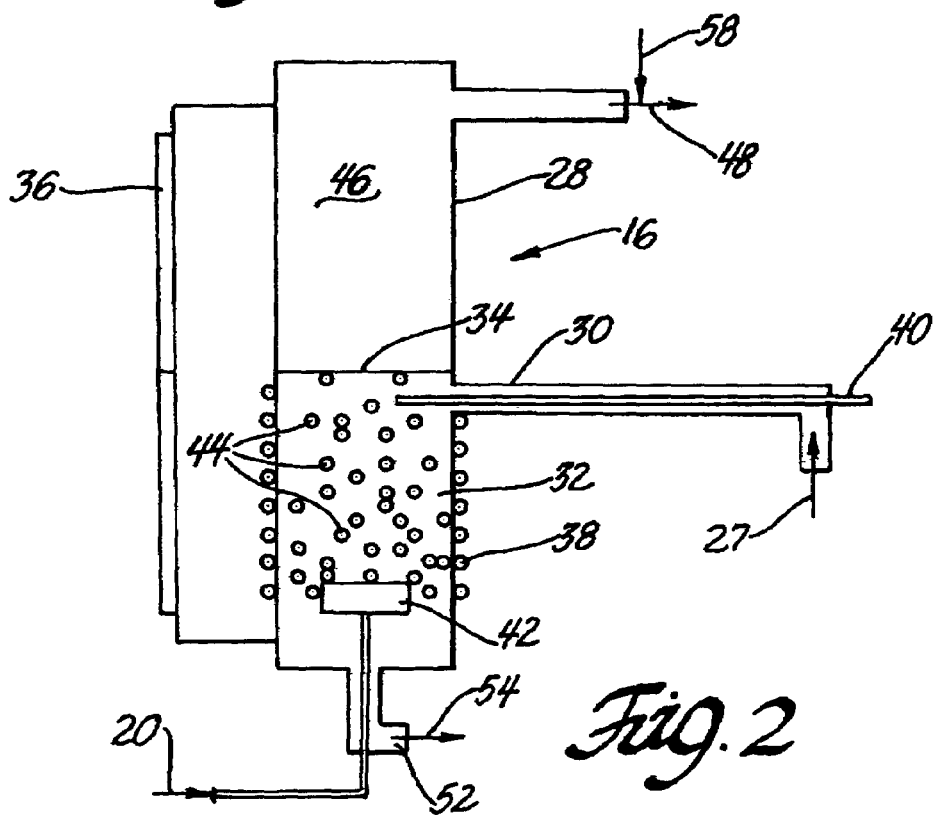
FIG. 2 is a side view of the cross-section of a continuous diesel fuel reforming vessel.

FIG. 2 shows a diesel fuel reformer 16 in a continuous operating mode. Raw diesel fuel, line 27 in FIG. 1, is pumped (by means not shown) from a vehicle fuel tank or other source of the fuel, not shown. The hydrocarbon mixture containing, liquid fuel is delivered through a fuel line 27 to reformer vessel 28. Reformer vessel 28 is suitably of round cylindrical shape, and supported in a vertical attitude convenient to the exhaust conduit (stream 10) of the vehicle. The reformer vessel 28 will be sized and shaped to hold a specified volume of liquid fuel with a vapor space for separation of liquid droplets from the vapor as an air plasma stream bubbles up through the liquid volume. The fuel flowing through a fuel line 27 enters vessel 28 through fuel inlet 30 at a location and rate suitable to maintain a liquid fuel volume 32 with a suitable fuel upper surface 34 level. Inlet 30 is shown at the side of vessel 28 near the top surface 34 of the liquid fuel volume 32. A fuel level indicator is illustrated at 36. The device may be any suitable optical or electro-mechanical device for sensing the upper surface 34 of liquid fuel volume 32 and prompting the pumping of additional fuel through fuel inlet 30 as required.

The liquid fuel volume 32 in reformer vessel 28 is preferably heated, such as with an electrical resistance heater coil 38 wound around the outside of the vessel. Heater coil 38 is powered by a suitable electrical energy source, not shown. Thermocouple 40, suitably inserted, for example, through fuel inlet 30, is used in combination with a suitable temperature control device, not shown, to control electrical activation of heater coil 38 to maintain the temperature of fuel liquid volume 32 in a suitable temperature range. For example, the liquid diesel fuel volume may be maintained in a range of about 100° C. to about 150° C. to facilitate stripping of a relatively low molecular weight vapor fraction from liquid volume 32 with air plasma stream 20 and reforming of the hydrocarbons with the ozone and activated atoms and radicals in stream 20.

An ozone-containing, air plasma stream 20 from hyperplasma reactor 14 is directed upwardly through the bottom of vessel 28 to air plasma sparger 42. The air plasma stream is dispersed into bubbles 44 as it passes through sparger 42. As bubbles 44 of air plasma rise through heated liquid fuel volume 32 they strip relatively low molecular weight hydrocabons from the liquid and carry the hydrocarbons into vapor space 46 at the top of vessel 28. Since the bubbles contain ozone and other reactive oxidizing chemical species, some of the stripped hydrocarbon molecules are oxidized in the vapor phase to low molecular weight alcohols and aldehydes (OHC). Also, ozone and other reactive oxidizing chemical species in the air plasma bubbles dissove into the liquid fuel and oxidize it in the liquid phase producing oxygenated hydrocarbons, some of which can subsequently vaporize. Thus, vapor space 46 of vessel 28 contains a complex mixture of chemical species which is continually carried by the flowing air plasma through an outlet at the top of vessel 28 and through reformed diesel fuel line 48 and merged as a sidestream addition with diesel exhaust 10.

As fractionated and reformed diesel fuel constituents are carried from fuel volume 32 into vapor space 46, the residual fuel volume is left with a higher molecular weight hydrocarbon portion of the original diesel fuel composition. Accoringly, liquid diesel fuel is continually withdrawn from a bottom outlet 52 of vessel 28 and carried (as fuel stream 54) to the operating engine, or returned to a fuel reservoir. Thus, in the operation of a continuous fuel reformer 16, diesel fuel (or diesel fuel seeded with ethanol or other OHC) and an air plasma stream are continually added to the vessel in controlled amounts, and reformed fuel vapor and stripped heavy fuel are continually removed.

Commercial diesel fuels are available in light to heavier grades depending on their usage. After reforming in accordance with this method, the stripped portion of the fuel readily yields $C_2$ and $C_3$ OHCs and the residual portion of the fuel contains high cetane value constituents suitable for compression ignition in an engine.

In this example, the temperature of reactor 12 is measured downstream of the CuY bed and at the outlet of the reactor by a thermocouple 56. The selective catalytic reduction reactor 12 promotes the chemical reaction between $NO_2$ and OHCs, producing innocuous $N_2$, $CO_2$ and $H_2O$ in reduction reactor exhaust 25. The chemical composition of the exhaust may be monitored by means, not shown, such as a gas-phase FTIR (Fourier Transform Infrared Spectrometer).

The temperature at the reactor 12 outlet (thermocouple 56) is used in controlling plasma power density in plasma reactor 14 and the volumetric feed ratios of reformed diesel fuel, line 48, and ozone, line 22 for effective operation of the catalytic reduction reactor 12. Temperature data from the catalytic reduction reactor is transmitted to a digital controller (not shown) for controlling plasma power density and amount of stream additions through lines 22 and 48. Stream additions to exhaust stream 10 through lines 22 and 48 are made separately, but the order of addition is not critical.

The heat and hydrocarbon content of stream 25 (FIG. 1) exhausted from catalytic reduction reactor 12 may be utilized as EGR, stream 26, by using it to supplement or replace a portion of air stream 18 entering the plasma reactor 14.

In general, the requirement for reformed diesel fuel constituents increases with increased $NO_x$ content in the exhaust and increased exhaust temperature (catalytic reactor temperature). For example, about 8 moles of reformed fuel normalized as $C_1$ hydrocarbon are required per mole of normalized $NO_x$ at a catalyst temperature of 200° C. Thus, the ozone requirement is greatest at catalytic reactor temperatures of 150-200° C. and decreases to zero at reactor temperatures of 350-400° C.

The following experiments illustrate the practice and effectiveness of the invention.

Experimental

Laboratory apparatus was made and operated to demonstrate the continuous fuel reforming process where a diesel fuel reformer and a hyperplasma reactor are used to produce highly reactive OHC's such as alcohols and aldehydes from raw diesel fuel for NOx reduction. Both raw diesel fuel and seeded diesel fuel were used for laboratory demonstration. The seeded fuel contained 0.3% ethanol, which is well below the flammability limit of the seeded diesel fuel that is approximately 1% ethanol.

A simulated diesel exhaust gas composed, by volume, normalized at the catalyst inlet, of 181.5 ppm NO, 24.5 ppm $NO_2$, 17.6% $O_2$, 2% $H_2O$, and the balance $N_2$ was used in the following laboratory scale tests. The system pressure was 101.3 kPa.

An unheated hyperplasma reactor like that shown in FIG. 3 was made of a quartz tube (8 mm O.D. and 6 mm I.D.) which served as a dielectric barrier. With the high voltage electrode in the center, it is made in a concentric cylindrical geometry. The hyperplasma reactor was operated at room temperature. Ambient air was flowed through the annular space between the center elctrode and the quartz tube. The ground electrode was made of a nickel-coated copper wire wound around the outer surface of the quartz tube in 20 turns at a pitch of 2 mm. The total length of the plasma generating area was 4 cm.

The plasma reactor was unheated. High frequency electrical power (HV=+/−10 kV) was supplied to the reactor at a level of 0.028 W. The flow of air was controlled to deliver 45 cc/min of the ozone-containing air plasma as a sidestream into the exhaust gas flow plus 10.7 to 31.0 cc/min of air plasma to the diesel fuel reformer.

A laboratory scale continuous diesel fuel reformer was made like continuous diesel fuel reformer 16 illustrated in FIG. 2. The laboratory fuel reformer was made of a stainless steel tube (1 inch o.d.×7.5 inches long), which held a constant amount (18 cc) of diesel fuel at a specified level. Either raw diesel fuel or seeded diesel fuel with 0.3% ethanol was used in the reformer. The diesel fuel was fed to the reformer through the fuel feed tube at a space velocity of either 1/h or 2/h. Fractionated and reformed vapor was removed from the vapor space of the vessel, and the stripped diesel fuel was continuously drained out of the reformer through the outlet tube at the bottom of the reformer. The feed and exit flow rates of the diesel fuel were controlled by a dual-channel peristaltic pump to keep the fuel level constant.

Air plasma generated by the hyperplasma reactor was fed to the reformer through an inlet tube at the bottom of the reformer vessel and passed through the vertical feed tube and the stainless steel sparger making fine bubbles in the volume of diesel fuel. The flow rate of the air plasma was controlled by a mass flow controller. The flow rate was varied from 10.7 to 31.0 cc/min in these tests. The air plasma bubbles containing highly reactive gaseous species such as ozone and radicals generated a large interfacial area for absorption into and reaction with liquid fuel, while vigorously agitating the liquid fuel during their travel upward. This led to an enhanced reformer performance for OHC production from diesel fuel due to enhanced gas absorption and reaction in the liquid phase. The temperature of the liquid fuel was controlled by a heating element and thermocouple as illustrated in FIG. 2. The preferred temperature range for the Swedish diesel fuel is 100-150° C. for the optimum performance of the fuel reformer. It was operated at a temperature of 125° C. in the tests described in this specification. The vapor of the reformed fuel containing OHC's flows through the exit tube for injection into the exhaust flow for NOx reduction over a suitable catalyst downstream. In these experiments dilution air, as indicated by dilution stream 58 in FIG. 2 was injected into the vapor stream at a rate of 71.4 cc/min to prevent possible condensation of the OHC/HC vapor in the flow path between the laboratory reformer and the unheated flow of simulated exhaust gas.

Experimental Results

The use of the low temperature ozone-containing air plasma to fractionate and reform diesel fuel was effective in generating OHC species as reductants for $NO_2$ in a lean-burn exhaust.

Figure 4:
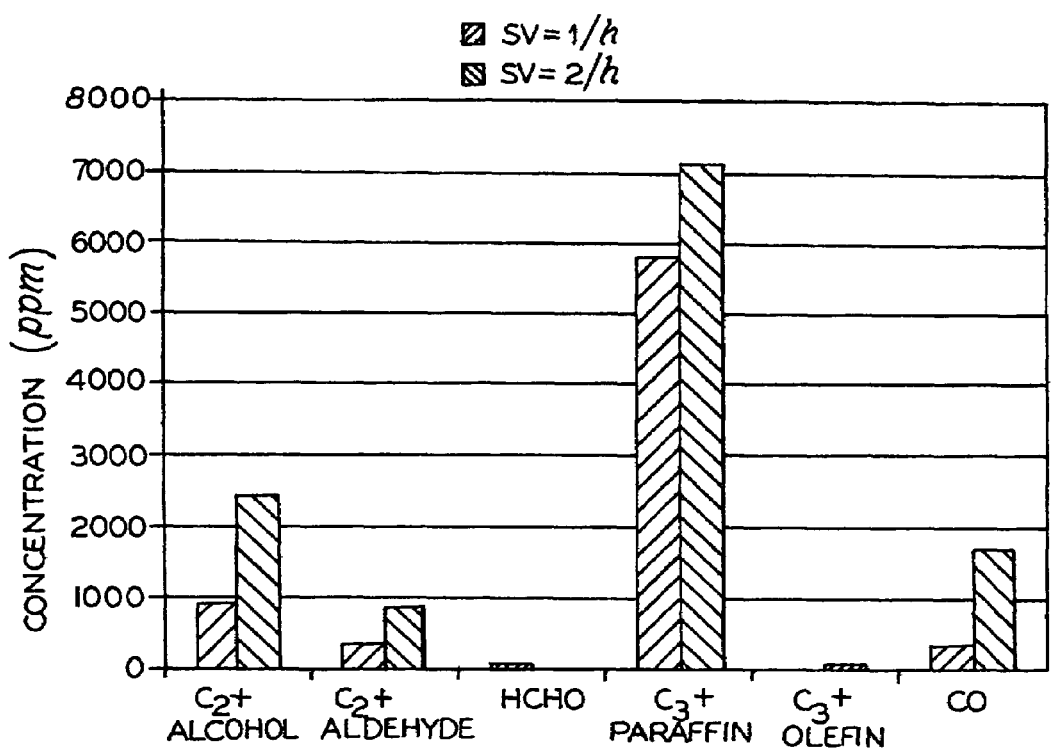
FIG. 4 is a bar graph showing the effect of fuel space velocity at fixed air plasma flow rate on the concentration in parts per million of reforming products (C2+ alcohols, C2+ aldehydes, formaldehyde, C3+ paraffin, C3+ olefin, and carbon monoxide) in the discharge stream of a continuous diesel fuel reformer.

FIG. 4 shows the effect of the fuel space velocity on the vapor product distribution of the fuel reformer for raw diesel fuel at 125° C., using two fuel delivery space velocities of 1/h and 2/h. The reformer was in a continuous operating mode with the feed and exit flow rates of the fuel controlled by a dual-channel peristaltic pump. The reformer temperature was kept at 125° C., while the flow rate of the air plasma was kept at 10.7 sccm by a mass flow controller. The plasma power was 0.028 W. The flow of dilution air carrying the reformate from the reformer was 71.4 sccm.

Major carbon-containing gaseous species from the reformer were measured by an FTIR and compared in FIG. 4. It is notable that significant amounts of OHC's such as C2+ alcohols (i.e. alcohols that contain two or more carbon atoms) and C2+ aldehydes were produced for both space velocity cases, while the predominant vapor products are C3+ paraffins. Minor amounts of formaldehyde and C3+ olefins were detected in the reformate stream. It is also to be noted that an increase of the fuel space velocity resulted in increases of both OHC and HC vapor concentrations. This may be attributed to the greater availability of lower molecular weight hydrocarbons with the higher circulation rate (2/h) of the diesel fuel.

Figure 5:
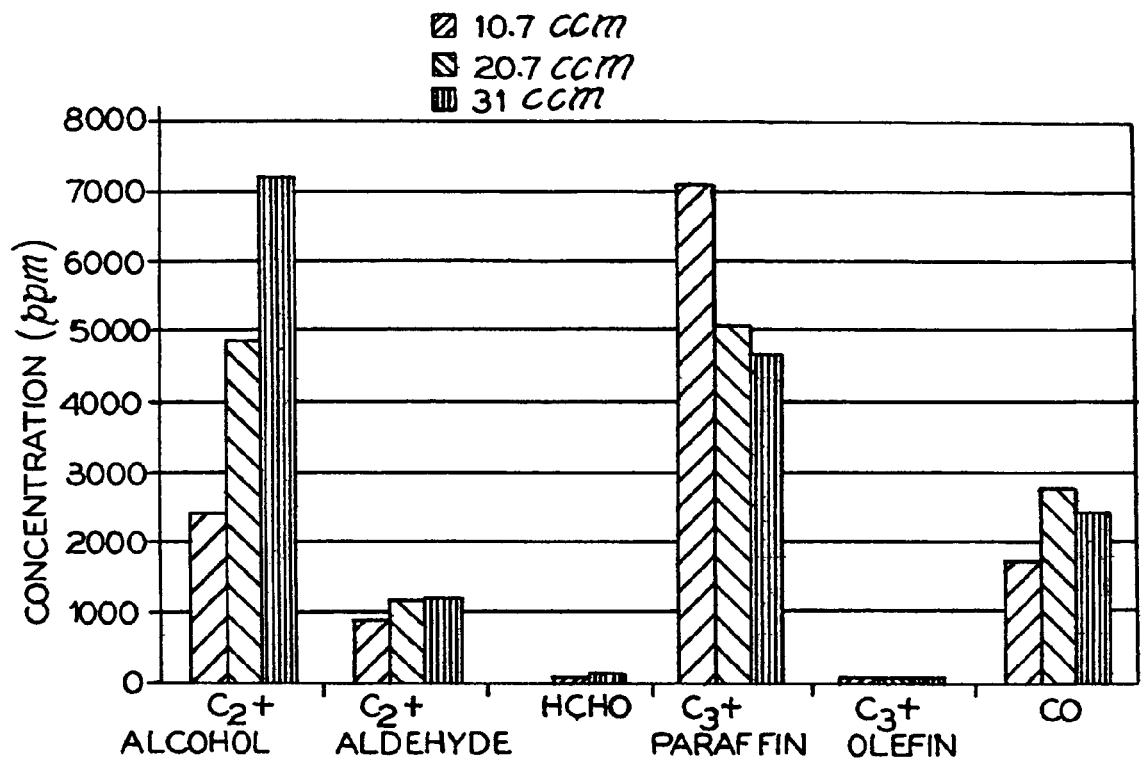
FIG. 5 is a bar graph showing the effect of air plasma flow rate on OHC/HC product distribution from a continuous diesel fuel reformer.

FIG. 5 shows the effect of the air plasma flow rate on OHC/HC product distribution from the diesel fuel reformer at 125° C., using three different rates (10.7 ccm, 20.7 ccm, and 31 ccm) of the air plasma flow. Diesel fuel was supplied to the reformer at a rate of 36 cch which corresponds to a diesel fuel space velocity of 2/h. The plasma power was 0.028 W. The flow of dilution air carrying the reformate from the reformer was 71.4 sccm.

It is interesting to see that the OHC concentrations (C2+ alcohols and aldehydes and formaldehyde) increase while the HC concentrations (C3+ paraffins) decrease with the increase of the air plasma flow rate. The increase of the OHC production with the increase of the air plasma can be explained by the increased supply of oxidants through the air plasma, but the corresponding decrease of HC production is not so simple to explain. The slight decrease in CO concentration at a high air plasma flow (i.e., 31.0 sccm) is due to the subsequent conversion of CO to $CO_2$, which is consistent with the increased supply of the oxidants at a high rate of the air plasma flow.

Figure 6:
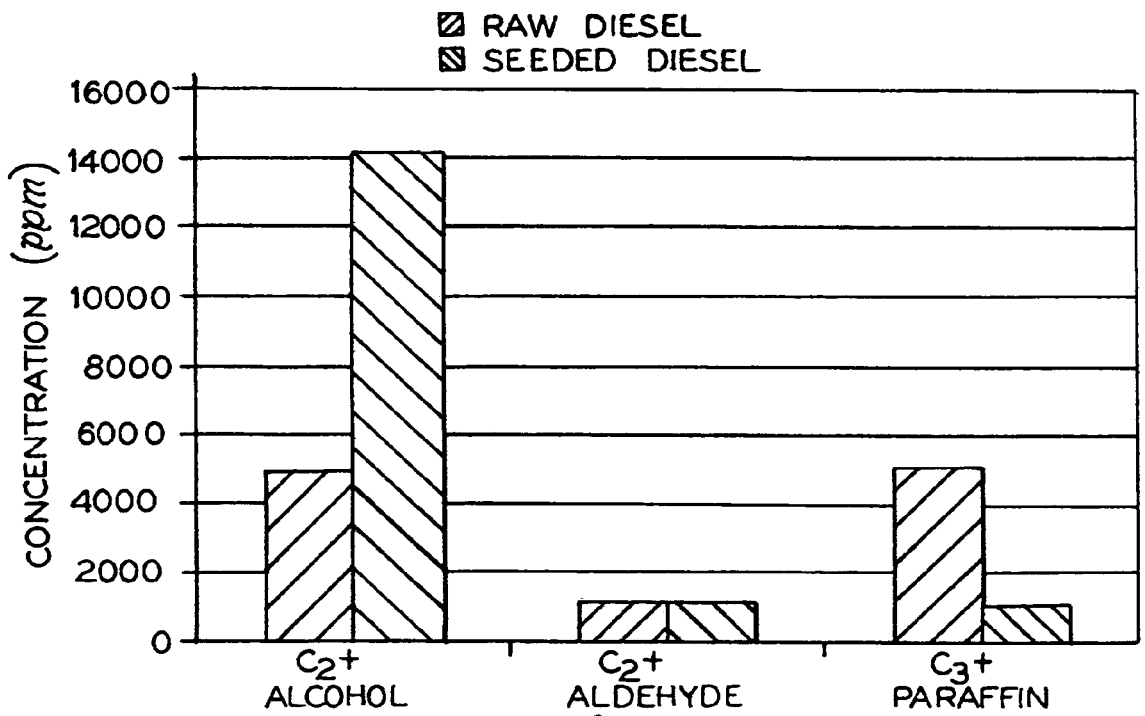
FIG. 6 is a bar graph showing the effect of seed alcohol on OHC/HC product distribution in the discharge stream of a continuous diesel-fuel reformer.

FIG. 6 compares the OHC/HC vapor products obtained from the raw diesel fuel with those from the seeded diesel fuel with 0.3% ethanol. Again, the plasma reactor power was 0.028 W. Air plasma was delivered to the reformer at the rate of 20.7 sccm and the temperature of the fuel in the reformer was maintained at 125° C. The flow of dilution air carrying the reformate from the reformer was 71.4 sccm.

Figure 7:
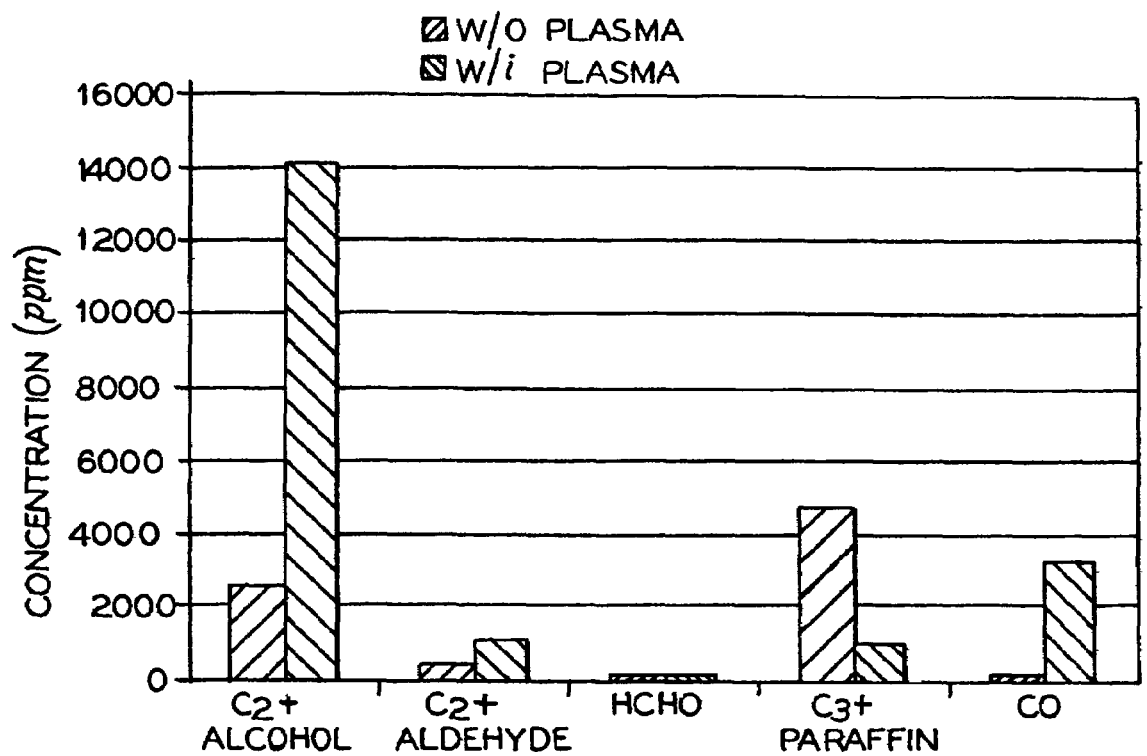
FIG. 7 is a bar graph showing the effect of plasma on OHC/HC product distribution from alcohol-seeded diesel fuel from a continuous diesel fuel reformer.

These tests demonstrate that the C2+ alcohol in the vapor products can be dramatically increased by seeding the raw diesel fuel with a trace amount of ethanol well below the flammability limit. An additional benefit of the seeded fuel is that it suppresses the C3+ paraffin vapor products, in the light of the fact that they induce deactivation of NOx reduction catalysts such as NaY and BaY catalysts at low temperatures below 300° C. due to coke formation on the catalyst surface FIG. 7 compares the OHC/HC products obtained from the seeded diesel fuel with or without the help of the air plasma. The plasma reactor power was 0 or 0.028 W. Air plasma was delivered to the reformer at the rate of 20.7 sccm. The diesel fuel feed rate was 36 cch and the temperature of the fuel in the reformer was maintained at 125° C. The flow of dilution air carrying the reformate from the reformer was 71.4 sccm.

These tests clearly demonstrate that the air plasma makes a significant contribution to the enhancement of the OHC production while suppressing the production of HC's such as C3+ paraffins.

Figure 8:
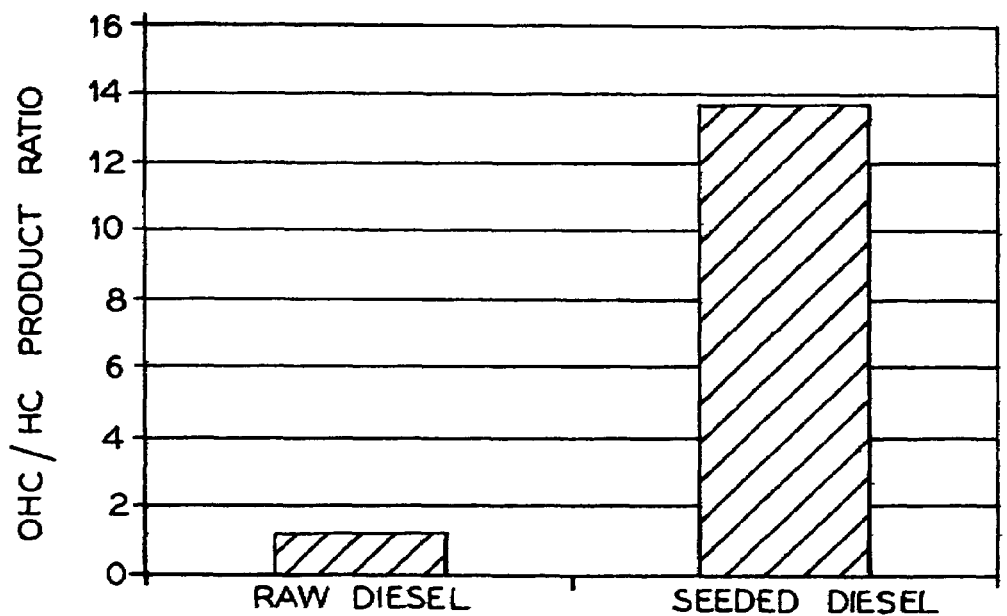
FIG. 8 is a bar graph showing enhanced OHC/HC product ratio by diesel fuel seeded with 0.3% by volume ethanol.

FIG. 8 compares the OHC/HC vapor product ratio obtained from raw diesel fuel reforming with the vapor product ratio from seeded diesel fuel (0.3% ethanol) reforming. The plasma reactor power was 0.028 W. Air plasma was delivered to the reformer at the rate of 20.7 sccm. The diesel fuel feed rate was at a space velocity of 2/h, and the temperature of the fuel in the reformer was maintained at 125° C. The flow of dilution air carrying the reformate from the reformer was 71.4 sccm.

In this comparison, the OHC product is represented by the sum of C2+ alcohols and C2+ aldehydes, while the HC product is represented by C3+ paraffins. Apparently, the seeded fuel greatly increases the OHC/HC product ratio compared with the raw diesel fuel. As discussed earlier, this is a direct result of the two beneficial effects of seeded diesel fuel. That is, the seeded fuel enhances the OHC production while suppressing the HC production.

Figure 9:
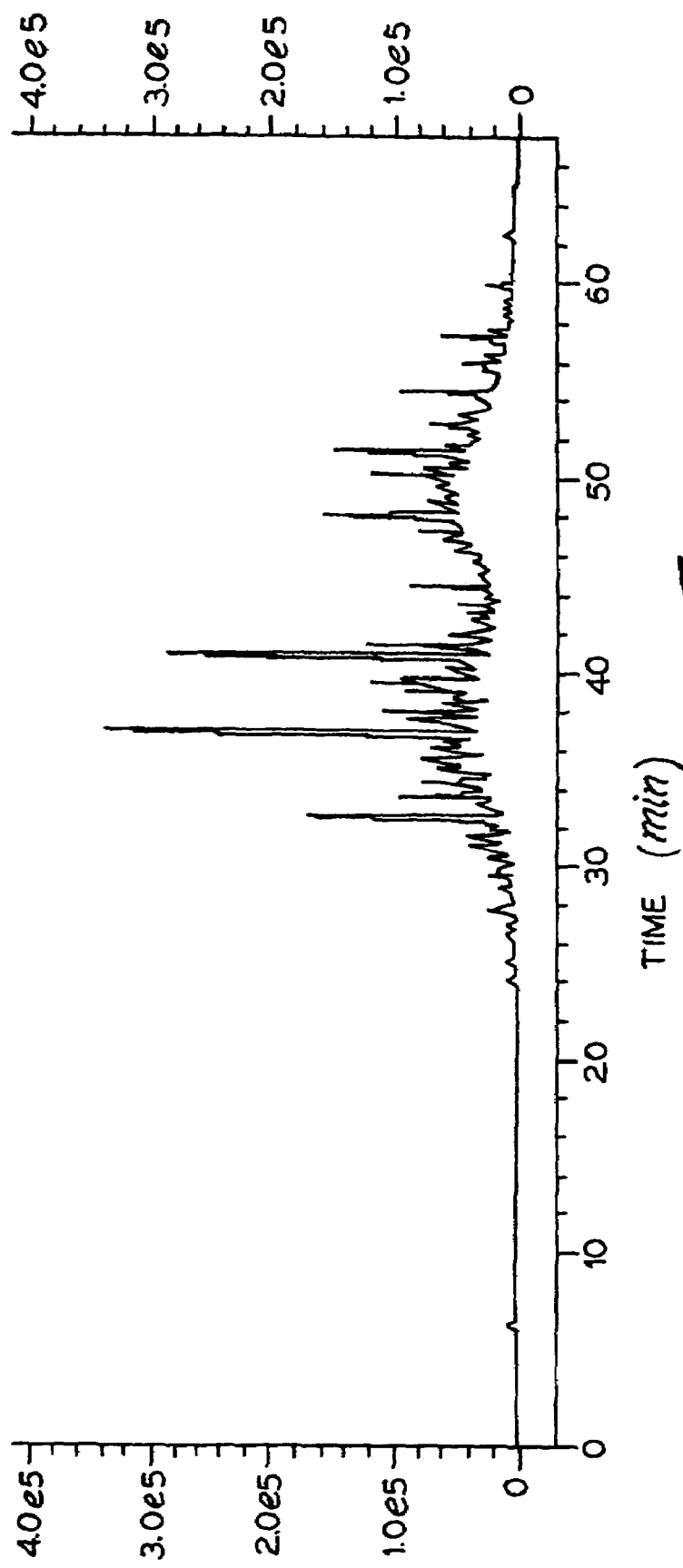
FIG. 9 is a gas chromatogram of raw diesel fuel seeded with 0.3% by volume ethanol.

FIG. 9 presents a gas chromatogram of the seeded diesel fuel with 0.3% ethanol measured by a FID detector. The fuel was analyzed on a common 25 m×0.2 mm i.d. capillary GC column coated with a 0.33 μm methylsilicone phase. Injection port, detector and final column temperatures were 230° C., 250° C. and 230° C., respectively. The retention times of the major peaks of the chromatogram are shown to be between 30 and 60 minutes, a characteristic elution behavior of heavy hydrocarbon species.

Figure 10A:
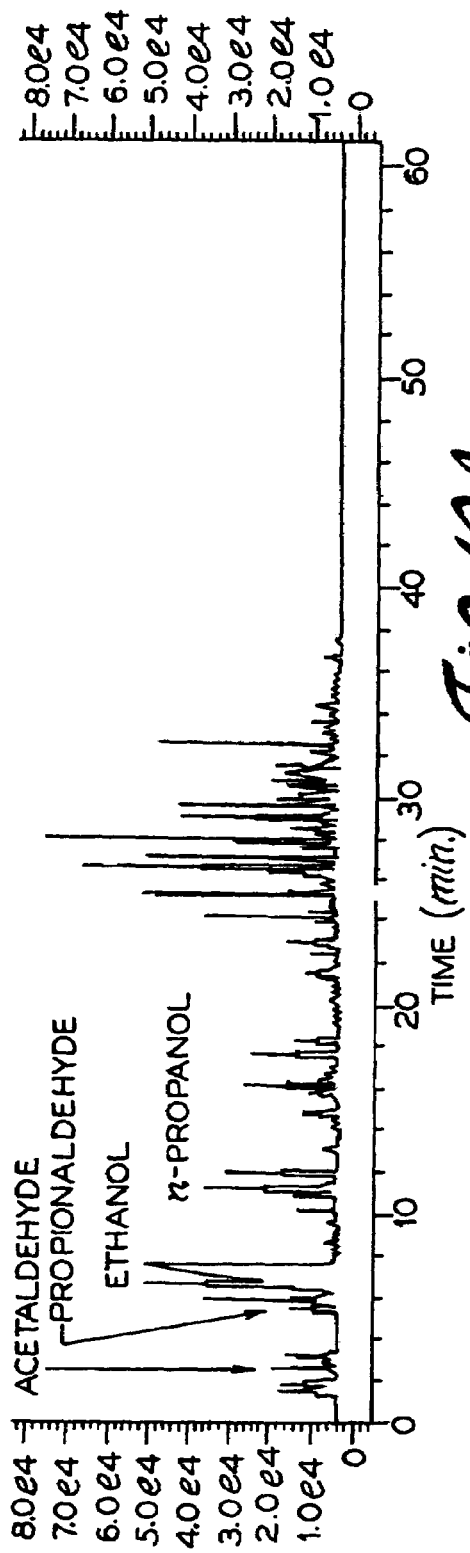
FIG. 10A is a gas chromatogram of vapor reformate from a continuous diesel fuel reformer.

FIG. 10A shows a gas chromatogram of the vapor product from the fuel reformer when the seeded fuel was used for reforming. It should be noted that the retention times of the major peaks in this case are between 1 and 35 minutes, a characteristic elution behavior of light hydrocarbon species. Comparing FIG. 10A with FIG. 9, it is evident that the seeded diesel fuel containing mainly heavy HC's with long GC retention times was fractionated and reformed by the fuel reformer to light HC's and OHC's, respectively, exhibiting short GC retention times. This observation confirms that the continuous diesel fuel reformer truly reforms and fractionates the diesel fuel.

Figure 10B:
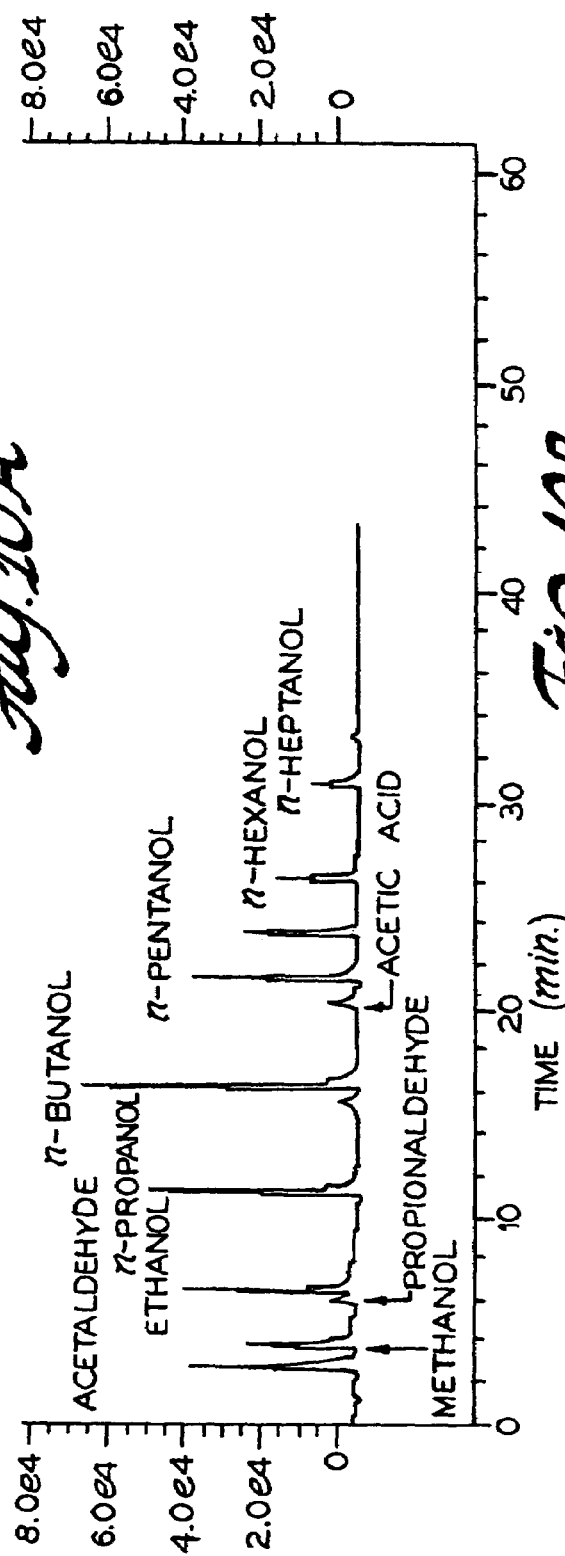
FIG. 10B is a gas chromatogram of reference oxygenates for comparison with FIG. 10A.

FIG. 10B presents as a reference the retention times of various OHC standards. Comparing FIG. 10A with FIG. 10B, it is clear that the continuous fuel reformer indeed produced significant amounts of OHC's which include C2+ alcohols (such as ethanol, propanol, butanol, etc.) and C2+ aldehydes (such as acetaldehyde, propionaldehyde, etc.). This observation is consistent with the results obtained by FTIR as shown earlier in FIGS. 6 and 7.

It is seen that diesel fuel can be used to provide oxygenated hydrocarbons useful for the catalytic reduction of nitrogen oxides in the exhaust of a diesel engine or other lean burn power plants. A particularly abundant amount of, for example, C2+ aldehydes and alcohols and C2+ olefins and paraffins are produced by a continuous process of fractionating and reforming diesel fuel or diesel fuel seeded with a trace amount of ethanol or similar C2 or C2+ alcohol or aldehyde. The fractionating and reforming of the fuel uses an ozone-containing air plasma, preferably with the air plasma being generated by a hyperplasma reactor. Diesel fuel is supplied to a reformer vessel and a volume of the fuel in the vessel is sparged with a continuous stream of air plasma. The air plasma stream removes lower molecular weight hydrocarbons from the fuel and chemically reforms these hydrocarbons to oxygenated hydrocarbons. The air plasma stream continually carries reformate to the NOx-containing exhaust stream, while the stripped diesel fuel is continually removed from the reformer vessel and returned to the fuel reservoir or consumed in the engine.

The use of the reformate chemical species obtained by the practice of the invention in selective catalytic reduction of nitrogen oxides in a lean burn exhaust is illustrated in the co-pending application docket number GP-305427, identified above.

The practice of the invention has been illustrated using a few specific embodiments. The illustrations are not intended to be limiting because other forms for fractionating and reforming the fuel will be apparent to those skilled in the art.

The invention claimed is:

1. A method of producing oxygenated hydrocarbons for reduction of nitrogen oxides in the exhaust of a lean burn engine or power plant, the method comprising:
continually delivering diesel fuel comprising hydrocarbons to a reformer vessel to maintain a liquid volume of the fuel in the vessel;
bubbling a stream of air plasma up through the liquid volume of fuel to reform some fuel hydrocarbons into oxygenated hydrocarbons and to continually strip oxygenated hydrocarbons and a portion of the fuel hydrocarbons from the liquid volume of fuel into the air plasma;
removing the air plasma stream comprising oxygenated hydrocarbons and fuel hydrocarbons from the vessel and conducting the oxygenated hydrocarbon-containing air plasma stream into exhaust of the lean burn power plant, and
removing stripped diesel fuel from the volume of fuel in the vessel.

2. A method of producing oxygenated hydrocarbons as recited in claim 1 further comprising subjecting the oxygenated hydrocarbon-containing exhaust to a reduction catalyst for reduction of nitrogen oxides by reaction with oxygenated hydrocarbons.

3. A method of producing oxygenated hydrocarbons as recited in claim 1 in which the diesel fuel delivered to the reformer vessel is seeded with an oxygenated hydrocarbon to produce oxygenated hydrocarbons in greater abundance than the seeded amount.

4. A method of producing oxygenated hydrocarbons as recited in claim 1 in which the diesel fuel delivered to the reformer vessel is seeded with ethanol to produce oxygenated hydrocarbons in greater abundance than the seeded amount.

5. A method of producing oxygenated hydrocarbons as recited in claim 1, further comprising:
generating the air plasma by passing a stream of air through nonthermal alternating passive and active electric fields for the generation of the plasma reactor output stream; and
bubbling a stream of the air plasma up through a liquid volume of fuel.

6. A method of producing oxygenated hydrocarbons as recited in claim 1 further comprising:
generating the air plasma by passing a stream of air through a non-thermal plasma reactor, wherein the non-thermal plasma reactor is a tubular vessel having a reactor space therein for flow-through passage of air, the plasma reactor comprising a high voltage electrode disposed within said reactor space and a ground electrode helically coiled around said tubular vessel in a discretely spaced pattern, thereby providing intertwined helical passive and active electric fields for the generation of the plasma reactor output stream; and
bubbling a stream of the air plasma up through the liquid volume of fuel.

7. A method of producing oxygenated hydrocarbons for reduction of nitrogen oxides as recited in claim 1 further comprising:
controlling the rate of delivery of diesel fuel to the reformer vessel to control the amount or composition of oxygenated hydrocarbons in the air plasma stream removed from the reformer vessel.

8. A method of producing oxygenated hydrocarbons for reduction of nitrogen oxides as recited in claim 1 and further comprising:
controlling the flow rate of air plasma through the liquid volume of fuel to control the amount or composition of oxygenated hydrocarbons in the air plasma stream removed from the reformer vessel.

9. A method of producing oxygenated hydrocarbons for reduction of nitrogen oxides as recited in claim 1 further comprising controlling the temperature of the liquid volume of fuel to control the amount or composition of oxygenated hydrocarbons in the air plasma removed from the reformer vessel.

10. A method of producing oxygenated hydrocarbons for reduction of nitrogen oxides as recited in claim 9 comprising controlling the temperature of the liquid fuel in the range of about 100° C. to about 150° C.

11. A method of producing oxygenated hydrocarbons for reduction of nitrogen oxides in the exhaust of a diesel engine powering a vehicle, the vehicle having a reservoir of diesel fuel, the method comprising:
   continually delivering diesel fuel comprising hydrocarbons to a reformer vessel on the vehicle to maintain a liquid volume of the fuel in the vessel;
   bubbling a stream of air plasma up through the liquid volume of fuel to reform some fuel hydrocarbons into oxygenated hydrocarbons and to continually strip oxygenated hydrocarbons and a portion of the fuel hydrocarbons from the liquid volume of fuel into the air plasma;
   removing the air plasma stream comprising oxygenated hydrocarbons and fuel hydrocarbons from the vessel and conducting the oxygenated hydrocarbon-containing air plasma stream into exhaust of the diesel engine, and
   removing stripped diesel fuel from the volume of fuel in the vessel and delivering the stripped diesel fuel to the engine for combustion or to the diesel fuel reservoir.

12. A method of producing oxygenated hydrocarbons as recited in claim 11 further comprising subjecting the oxygenated hydrocarbon-containing exhaust to a reduction catalyst for reduction of nitrogen oxides by reaction with oxygenated hydrocarbons.

13. A method of producing oxygenated hydrocarbons as recited in claim 11 in which the diesel fuel delivered to the reformer vessel is seeded with an oxygenated hydrocarbon to produce oxygenated hydrocarbons in greater abundance than the seeded amount.

14. A method of producing oxygenated hydrocarbons as recited in claim 11 in which the diesel fuel delivered to the reformer vessel is seeded with ethanol to produce oxygenated hydrocarbons in greater abundance than the seeded amount.

15. A method of producing oxygenated hydrocarbons as recited in claim 11, further comprising:
   generating the air plasma by passing a stream of air through nonthermal alternating passive and active electric fields for the generation of the plasma reactor output stream; and
   bubbling a stream of the air plasma up through a liquid volume of fuel.

16. A method of producing oxygenated hydrocarbons as recited in claim 11 further comprising:
   generating the air plasma by passing a stream of air through a non-thermal plasma reactor, wherein the non-thermal plasma reactor is a tubular vessel having a reactor space therein for flow-through passage of air, the plasma reactor comprising a high voltage electrode disposed within said reactor space and a ground electrode helically coiled around said tubular vessel in a discretely spaced pattern, thereby providing intertwined helical passive and active electric fields for the generation of the plasma reactor output stream; and
   bubbling a stream of the air plasma up through the liquid volume of fuel.

17. A method of producing oxygenated hydrocarbons for reduction of nitrogen oxides as recited in claim 11 further comprising:
   controlling the rate of delivery of diesel fuel to the reformer vessel to control the amount or composition of oxygenated hydrocarbons in the air plasma stream removed from the reformer vessel.

18. A method of producing oxygenated hydrocarbons for reduction of nitrogen oxides as recited in claim 11 and further comprising:
   controlling the flow rate of air plasma through the liquid volume of fuel to control the amount or composition of oxygenated hydrocarbons in the air plasma stream removed from the reformer vessel.

19. A method of producing oxygenated hydrocarbons for reduction of nitrogen oxides as recited in claim 11 further comprising controlling the temperature of the liquid volume of fuel to control the amount or composition of oxygenated hydrocarbons in the air plasma removed from the reformer vessel.

20. A method of producing oxygenated hydrocarbons for reduction of nitrogen oxides as recited in claim 19 comprising controlling the temperature of the liquid fuel in the range of about 100° C. to about 150° C.

* * * * *